UNITED STATES PATENT OFFICE.

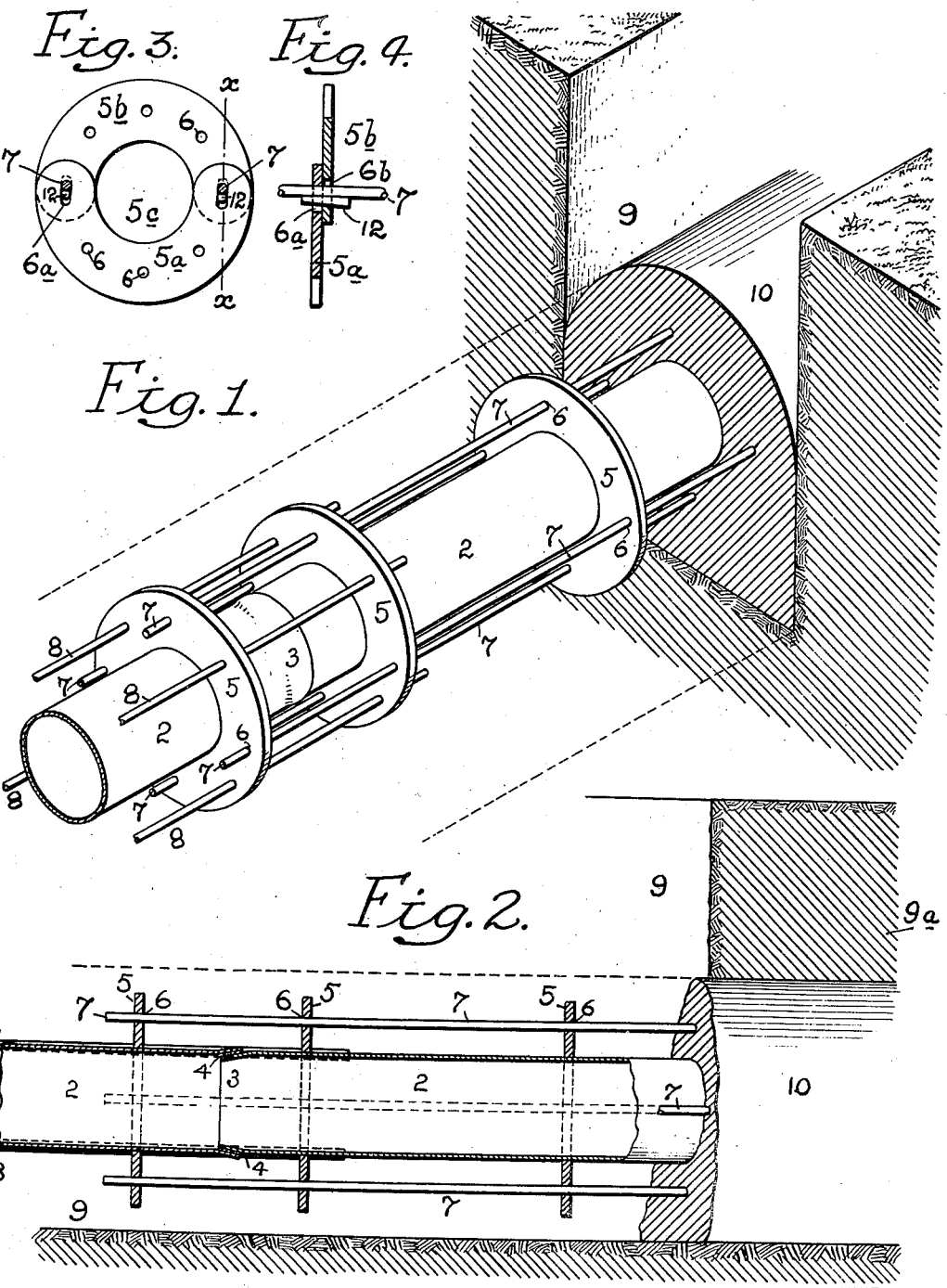

JACOB B. BLAW, OF ATLANTIC CITY, NEW JERSEY.

REINFORCED-CONCRETE CONDUIT.

1,310,597. Specification of Letters Patent. Patented July 22, 1919.

Application filed October 18, 1917. Serial No. 197,230.

*To all whom it may concern:*

Be it known that I, JACOB B. BLAW, a citizen of the United States, and resident of Atlantic City, county of Atlantic, and State of New Jersey, have invented an Improvement in Reinforced-Concrete Conduits, of which the following is a specification.

The object of my invention is to provide an inexpensive and durable construction of conduit which can be rapidly laid to form a continuous structure and which, when completed is well adapted to withstand internal pressure; and in the preferred construction of my invention, my object is to provide a reinforced monolithic conduit or pipe substantially built in place in the ground and having alinement to correspond to the topographical conditions encountered.

More particularly, the object of my invention is to form a conduit of reinforced concrete, the said concrete to be provided with an interior light metal lining braced by suitable metal reinforcing which furthermore reinforces the concrete body surrounding the lining.

A further object of my invention is to provide a special construction in which the conduit adjacent to the lining joints is more heavily reinforced and strengthened than the remaining portions of the conduit, whereby said joints are protected against leakage due to weakening from any cause which might induce cracking of the concrete at other points intermediate of the joints.

My invention also consists of improvements hereinafter described whereby the above objects and results are attained, said improvements comprising certain organization and combination of parts which are fully described hereinafter and more particularly defined in the claims.

For the purpose of illustrating my invention, I have shown in the accompanying drawings the embodiment thereof which is at present preferred by me, since the same is in form to give satisfactory and reliable results, but it is to be understood that the several instrumentalities of which my invention consists, can be variously arranged and organized and that my invention is not limited to the precise arrangement and organization of the instrumentalities herein shown and described.

Referring to the drawings:—Figure 1 is a perspective view, partly in section, illustrating the general nature of the construction embodying my improved conduit structure; Fig. 2 is a longitudinal sectional elevation of the same; Fig. 3 is an elevation of one form of the reinforcing rings and illustrating a portion of the reinforcing rods in section; Fig. 4 is a sectional view of Fig. 3, taken on line $x$—$x$.

The lining of the conduit is made up of a plurality of light sheet metal tubular sections 2, 2, which may be formed of sheet metal or light drawn tubing of any suitable character. This lining may be of sheet metal of any desired thickness, but in many cases it would suffice if made of light sheet metal such as water-spouting such as used on buildings for draining the roof water, as the main strength of the conduit resides in the concrete and reinforcing about the said tubing. While such water-spouting would have seams, this is not material as said seams are thoroughly incased in the outer covering and otherwise may be made water or liquid proof to suit the purpose for which the conduit is to be employed. The joints between the lining sections 2, 2, may be of a sleeved or telescopic construction, as at 3, and may be made liquid-tight by a suitable liquid-proofing compound 4 placed in the joints, such compound being of a varnish nature, rubber cement or any other material which would insure a tight union. This lining forms of itself a tubular conduit of a more or less frail nature, but when surrounded with a concrete body 10, it is supported at every point along its length. Moreover, it provides a form about which the concrete is conveniently placed. In practice, the conduit would be laid in a longitudinal trench 9 in the earth at any depth desired, the said trench confining the sides and bottom of the concrete 10 which is deposited in the trench about the metallic lining tubes, as will be readily understood by reference to Figs. 1 and 2. After the concrete of the conduit is in place and set, the trench 9 is filled up with earth as at 9ª (Fig. 2). In view of the fact that there would be liability of the concrete cracking in case of any undue settling which is apt to occur from unlooked for causes, I reinforce not only the concrete but the metal tubing by the employment of annular metal parts encompassing the tubular lining and longitudinal rods which are supported by the annular metal parts at a distance from the tubing but so as to be wholly inclosed within the concrete, and will now describe in detail this reinforcing construction.

The numerals 5 indicate a series of annular or ring-shaped reinforcing transverse parts surrounding the metal lining 2 at intervals, as will be clearly understood from Figs. 1 and 2. These annular or ring-shaped portions may be made of castings or stamped sheet metal and of any desirable configuration which will enable them to be sleeved upon the lining tubes 2. These annular portions 5, 5, are furthermore provided with apertures 6, 6, properly arranged therein to receive the rods 7 and 8 which extend longitudinally and in parallel relation to the lining tubes 2, 2, but held out of contact therewith. It will be observed that two of the annular portions 5, 5, which are arranged immediately on each side of one of the joints 3 of the lining, are provided with twice the number of holes 6 as necessary to the annular portions 5 about the said tubes and intermediate of the annular portions adjacent to the joints, but it is manifest that all of the ring-shaped portions may be made with the same number of holes, if so desired, a portion only of which would be employed in the case of those annular portions not associated with the reinforcing of the joints, such, for example, as the right-hand annular portions in Figs. 1 and 2. The presence of such additional holes would form no objection and would enable all of the annular portions to be made with the same dies or patterns. At the joints 3 of the lining, there is provided at each side of the joint one of the annular portions 5, and it will be observed that the longitudinal rods 7, corresponding to the tubular body at one side of the joint, are extended across the joint and through the two adjacent annular portions 5; and similarly, the longitudinal rods 8 from the tubular body at the other side of the joint likewise are extended across the joint and through the apertures in the two annular portions 5 adjacent to the joint. Moreover, these rods 7 and 8 are arranged out of alinement so that the overlapping portions of said rods may extend through the two annular portions 5, 5, next to the joint without interference. The overlapping portions are spaced equally apart around the joint and in this manner provide twice as much reinforcement adjacent to the joint as is provided throughout the longitudinal portions of the lining tubes 2 intermediate of the joints. In this manner there is far less liability of the concrete cracking adjacent to the joints and permitting a leak. As will be understood, all of the annular portions 5, 5, as well as the rods 7 and 8 supported thereby, are embedded within the concrete body 10, and in that way not only reinforce the concrete but help to strengthen the lining tubes, and furthermore hold them in definite relation especially at the joints during the preliminary laying of the metal work before the concrete is poured into the trench or during the act of forming the continuous conduit. In a conduit of the above character, it will be seen that though the lining tubes are in sections and have no rigidly bolted joints, the surrounding reinforced concrete structure will insure a strong and tight mass of material about the lining, and the whole will constitute a strong continuous conduit largely composed of concrete.

As a further means of facilitating the laying of the metal work of the conduit, the annular portions 5, 5 may be made of the construction shown in Figs. 3 and 4, the same consisting of two semi-circular portions of similar construction and arranged in pairs to form an annular construction with the ends overlapping and connected by means of the rods 7 and 8, as the case may be, which hold the semi-circular sections together. More specifically referring to Figs. 3 and 4, $5^a$ represents one annular section and $5^b$ the other. These are overlapped as indicated, so that the slotted holes $6^a$ and $6^b$ in the respective sections come into alinement, and through these slots the rods 7 are passed, thereby connecting the semi-circular sections $5^a$ and $5^b$. These sections may be clamped to the rods and to the tubular lining by employing wedges 12 which are driven through the slots as indicated in Fig. 4, the action of said wedges clamping the rods 7 in position on the section $5^a$ and drawing the other section $5^b$ downward tightly upon the tubular lining. These semi-circular sections $5^a$ and $5^b$ are furthermore provided with apertures 6 for the remaining rods 7 or 8, as the case may be. The number of apertures shown in Fig. 3 would correspond to the number shown in the annular portions 5 adjacent to the joints 3 in Figs. 1 and 2. When the two annular portions are in position, they provide the circular aperture $5^c$ which fits snugly about the tubular lining portions 2.

The sectional construction of the annular portions indicated in Figs. 3 and 4 will facilitate the laying of the conduit for the following reasons: The semi-circular sections $5^a$ may be adjusted in the trench upon a lower layer of concrete and the bottom rods 7 and 8 adjusted. The tubular lining sections 2 are then placed in position and the joints cemented, the said lining resting in the semi-circular sockets provided by these semi-circular portions $5^a$. The upper semi-circular portions $5^b$ may then be placed in position and the remaining rods inserted. This being done, the remaining concrete mass may be deposited in the trench and envelop the metal work so provided. By making the annular portions of two semi-circular parts as indicated in Figs. 3 and 4, there will be less difficulty in applying them than in the case of the full annular or ring-shaped portions 5 shown in Fig. 1 which would necessitate their being threaded along the tubular lining as each section is laid and before the joints are formed.

It will be understood that any suitable manner of providing side outlets may be employed, but I do not in this application make claim to any specific details in this respect.

It will be apparent that the conduit structure herein described and shown may have as many rods 7 and 8 about the tubular lining as may be desired, and moreover may have as many annular reinforcing portions 5 as preferred, according to the amount of rigidity and strength and according to the diameter of the conduit passage desired, and I do not limit myself in any respect in these regards, as they will be modified to suit the requirements in each particular case. Furthermore, it will be seen that because of the thorough bracing or reinforcing of the concrete not only by the lining but by the longitudinal rods 7 and 8 associated with the annular portions 5 or their equivalents, the conduit structure as a whole is made so very strong and rigid that no breakage or injury thereto is likely to occur except under most extreme conditions, and consequently, a strong and durable liquid-tight conduit is hereby provided at a relatively low cost.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. A conduit structure comprising a plurality of sheet metal tubular lining sections jointedly connected, combined with a plurality of surrounding metal annual portions sleeved upon the tubular lining sections and spaced apart along their length, longitudinal rods extending through the annular portions and supported thereby at a distance from the tubular lining sections and in which the rods surrounding said sections project far across the jointed portions of the tubular lining sections so as to each extend partly along a plurality of sections and the rods of each section overlap each other and engage at least one annular metal portion of each of two sections.

2. A conduit structure comprising a plurality of jointed tubular metal lining sections, combined with a plurality of surrounding metal annular portions sleeved upon the tubular lining sections and spaced apart along their length, longitudinal rods extending through the annular portions and supported thereby at a distance from the tubular lining sections said rods extending across the jointed portions of the tubular lining, the rods arranged along the length of one tubular lining section overlapping the rods extending along the length of the adjacent tubular section and said overlapping rods received by two annular portions which are arranged on opposite sides of the joint between the two lining sections whereby the rod reinforcing adjacent to the lining joint is greater than the rod reinforcement at other portions along the length of the lining intermediate of the joints, and a surrounding body of concrete inclosing all of the said metal portions and reinforced thereby.

3. A conduit structure comprising a plurality of sheet tubular lining sections jointedly connected, combined with a plurality of surrounding metal annular portions sleeved upon the tubular lining sections and spaced apart along their length, said annular portions each consisting of a plurality of curved parts having apertures for rods and coupled together to constitute annular parts about the tubular lining, longitudinal rods extending through the curved parts of the annular portions uniting said curved parts into annular forms and supported thereby at a distance from the tubular lining sections said rods extending far across the jointed portions of the tubular lining and overlapping upon the respective lining sections, and a surrounding continuous body of concrete extending over all of the joints of the lining sections and inclosing all of the said metal portions and reinforced thereby.

4. A conduit structure comprising a plurality of jointed tubular metal lining sections, combined with a plurality of surrounding metal annular portions sleeved upon the tubular lining sections and spaced apart along their length, said annular portions each consisting of a plurality of curved parts having apertures for rods and coupled together to constitute annular parts about the tubular lining, longitudinal rods extending through the curved parts of the annular portions and supported thereby at a distance from the tubular lining sections said rods extending across the jointed portions of the tubular lining, keys driven through the apertures in the overlapping portions of said curved parts for clamping said parts upon the tubular lining sections and also upon the rods which connect them, and a surrounding continuous body of concrete inclosing all of the said metal portions and reinforced thereby.

5. A composite conduit comprising a lining of light sheet metal of tubular sections connected together by liquid-tight joints, a reinforcing of metal surrounding the lining sections and comprising transverse annular parts spaced along the length of the tubular lining sections, longitudinal rods extending through the said annular portions and across the joints thereof of the tubular lining sections so as to overlap a plurality of said sections, and held at a distance from said lining sections not only along their length but also across the joints thereof, and a continuous body of concrete surrounding the tubular lining portions and enveloping the metal reinforcing portions so as to form a continuous reinforced concrete conduit with a sheet metal lining.

6. A composite conduit comprising a lining of light sheet metal of tubular sections connected together by liquid-tight joints, a reinforcing of metal surrounding the lining sections and comprising transverse annular parts spaced along the length of the tubular lining sections, longitudinal rods extending through the said annular portions and across the joints thereof and held at a distance from said lining, the longitudinal rods being formed in lengths slightly greater than the lengths of the corresponding tubular lining sections and the rods corresponding to adjacent lining sections with each other overlapping at the joints of said sections to provide an increased reinforcing of the conduit structure adjacent to said joints in the lining, and a continuous body of concrete surrounding the tubular lining portions throughout their combined length and enveloping the metal reinforcing portions so as to form a continuous reinforced concrete conduit with a sheet metal lining.

In testimony of which invention, I hereunto set my hand.

JACOB B. BLAW.

Witnesses:
R. M. HUNTER,
E. W. S. GEORGE.